A. COPONY.
EGG CRATE.
APPLICATION FILED SEPT. 22, 1915.

1,232,226.

Patented July 3, 1917.
2 SHEETS—SHEET 1.

Witnesses:
W. F. Smith

Inventor:
Alfred Copony
by Jones, Addington, Ames & Seibold
Attys.

A. COPONY.
EGG CRATE.
APPLICATION FILED SEPT. 22, 1915.
1,232,226.
Patented July 3, 1917.
2 SHEETS—SHEET 2.
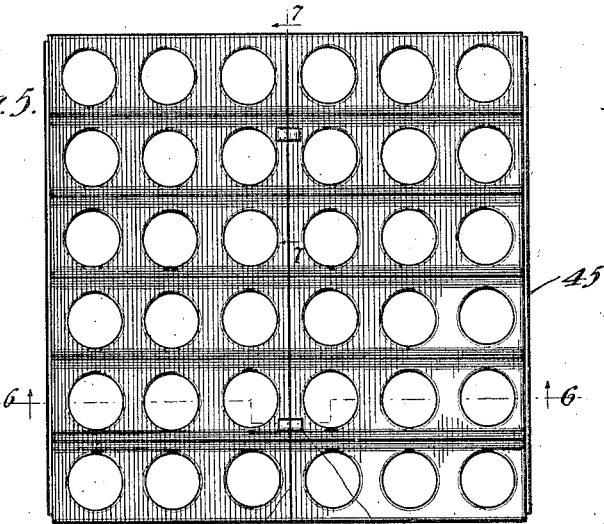
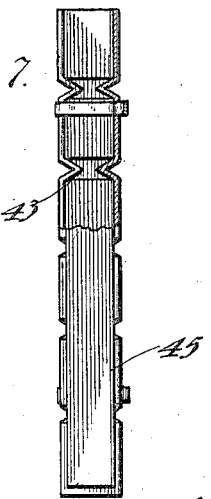
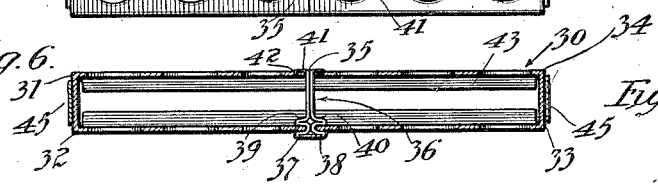
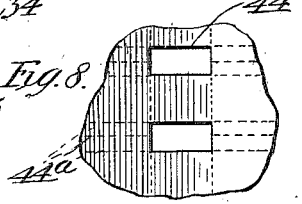
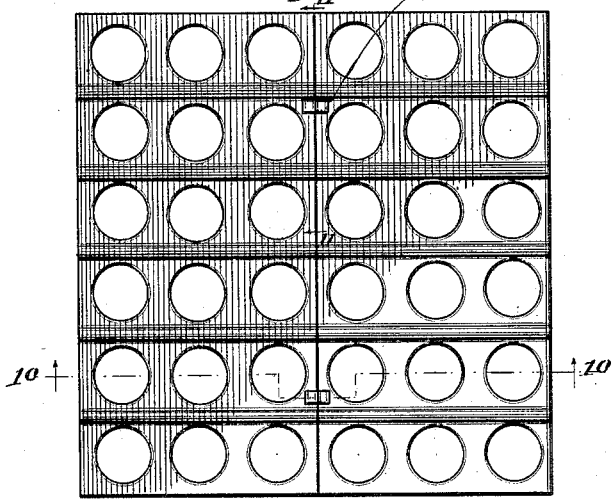
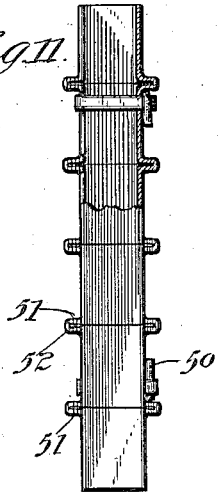
Witnesses:
Inventor:
Alfred Copony
by Jones, Addington, Ames & Seibold
Attys.

UNITED STATES PATENT OFFICE.

ALFRED COPONY, OF CHICAGO, ILLINOIS, ASSIGNOR OF ONE-HALF TO CHARLES R. COOPER, OF CHICAGO, ILLINOIS.

EGG-CRATE.

1,232,226.  Specification of Letters Patent.  Patented July 3, 1917.

Application filed September 22, 1915. Serial No. 52,002.

*To all whom it may concern:*

Be it known that I, ALFRED COPONY, a subject of the Emperor of Austria, residing at Chicago, in the county of Cook and State of Illinois, have invented new and useful Improvements in Egg-Crates, of which the following is a full, clear, concise, and exact description, reference being had to the accompanying drawing, forming a part of this specification.

My invention relates to egg crates and more specifically to a folder in which the eggs are placed.

Among the objects of my invention is to provide a folder which is easy to fill, which can be easily and quickly fastened together, which is of simple construction, and which can be manufactured cheaply.

In the drawings, in which I have shown several embodiments of my invention—

Fig. 5 is a plan view of a modified form of folder provided with reinforcing ribs;

Fig. 6 is a vertical section of Fig. 5;

Fig. 7 is an end elevation of Fig. 5 parts being broken away to show the interior construction;

Fig. 8 is a fragmentary view of the blank from which the folder shown in Figs. 5, 6 and 7 is made;

Fig. 9 is a plan view of a still further modification of the folder;

Fig. 10 is a vertical section of Fig. 9; and

Fig. 11 is an end elevation of the folder of Fig. 9 parts being broken away.

Figure 1:
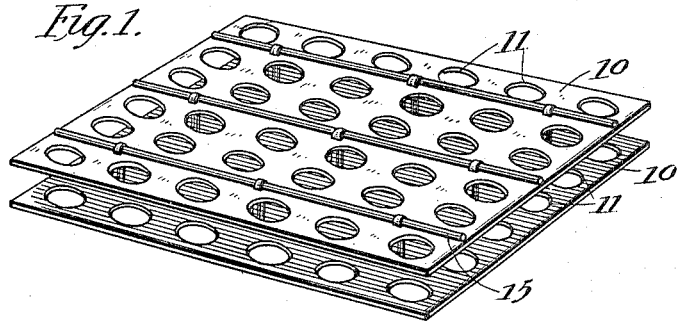
Figure 1 is a perspective view of a folder or holder for the eggs in which two sheet portions are held together by loops and rods.
Figure 2:
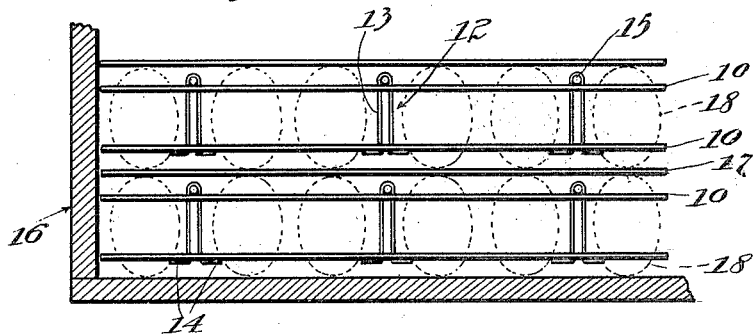
Fig. 2 is a vertical section showing part of an egg crate with folders such as shown in Fig. 1 in position therein.

Referring now to the drawings in detail and first to Figs. 1 and 2, the folder of this modification comprises two parallel sheets 10 which may be of straw-board or other suitable material, which sheets are provided with openings 11 to receive the ends of the eggs, and with securing means 12 for fastening the two sheets together to hold the eggs therebetween. The securing means 12 comprise a plurality of fasteners each of which comprises a loop portion 13 which extends from one of the sheets 10 to the other and through an opening in the upper sheet, and bent portions 14 which extend laterally to form shoulders for engagement with the lower sheet 10. Rods 15 are inserted through the upper ends of the loop portions 13 and engage the upper sheet 10 to hold the two sheets together. After the folders have been filled with eggs and the sheets secured together they are placed in position in the crate 16 with sheets 17 of straw-board or other suitable material located between the eggs 18 in the folders.

In using this folder the sheets 10 are separated, the ends of the eggs are placed in the openings 11 in the lower sheet, the upper sheet 10 is then placed in position so that its openings 11 will receive the upper ends of the eggs and so that the loop portions 13 will extend through the openings provided in the sheets. The rods 15 are then inserted through the portion of the loop 13 which projects above the upper sheet 10 and the folder is then placed in the crate 16.

Figure 3:
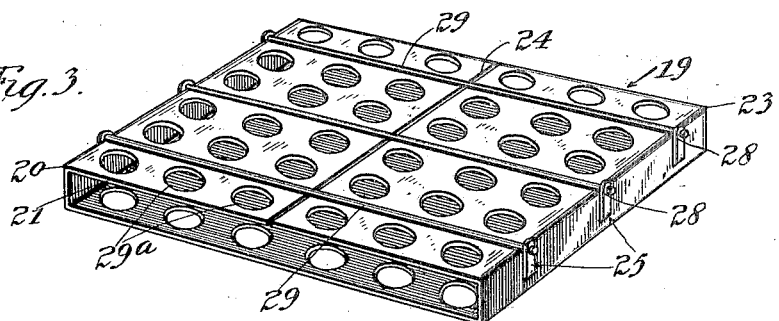
Fig. 3 is a perspective view of a modified form of holder.
Figure 4:
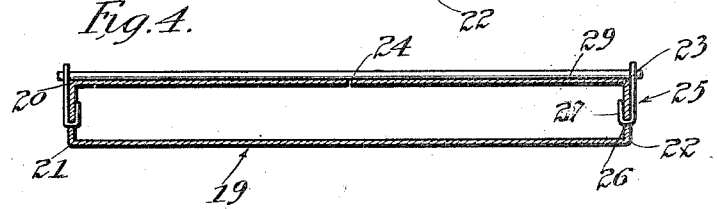
Fig. 4 is a vertical section of the folder of Fig. 3.

In Figs. 3 and 4 I have shown a folder formed from a single sheet 19 of suitable material such as straw-board which is bent as shown at 20, 21, 22 and 23 to form a rectangular folder, the edges of which meet at 24. For holding the upper flaps in position after the eggs are in the folder straps 25 are secured to the ends of the folder which are bent inwardly as shown at 26 to extend through openings in the folder and are bent upwardly as shown at 27 and clenched to hold the strap in position on the folder. These straps are provided with openings 28 through which rods 29 may be inserted which extend across the upper portion of the folder to hold the flap in place. The upper and lower portions of the folder are provided with opposed openings $29^a$ to receive the ends of the eggs.

In using this folder the rods 29 are removed, the upper flaps are opened, the eggs are placed in the openings in the lower portion of the folder and the upper flaps are then folded down so that the openings 29ª will receive the upper ends of the eggs and the rods 29 are then inserted to hold the flaps in position.

In the modification of Figs. 5, 6, 7 and 8 the folder is formed from a single sheet of suitable material bent at 31, 32, 33 and 34 to provide bottom, side and flap portions, the edges of which flap portions meet as shown at 35. For securing the flaps in position suitable fasteners 36 which may be of sheet metal are provided which are bent to form shoulder portions 37, 38, 39 and 40 for holding the fastener in position with respect to the bottom of the folder. These fasteners are provided at their upper ends with laterally bent portions 41 forming shoulders for engagement with the upper portions of the flaps and with downwardly bent portions 42 which form retaining fingers and extend into openings formed adjacent the edges of the flap portions.

In this modification I have shown the bottom and flap portions as provided with V-shaped reinforcing ribs 43 to prevent buckling. In the blank shown in Fig. 8 from which this folder is formed the portion which forms the side of the folder is cut away to form openings 44 which will permit of the blank being folded along the line 44ª to form the ribs 43. After the blank has been formed a strip 45 is secured along the side of the folder to prevent the ribs 43 from spreading.

In using this folder the flaps are opened, the eggs are placed in position in the openings in the bottom of the folder, the flaps are then folded down on the eggs and the meeting edges of the flaps bent to spring past the upper ends of the fasteners 36 and allowed to spring back so that the finger portions 42 of the fasteners will enter the openings in the edges of the flaps.

In the modification of Figs. 9, 10 and 11 the folder is formed of a single sheet of suitable material which is bent substantially as the folder of Figs. 5, 6, 7 and 8.

In this modification the flaps are held in position by means of fasteners 46 each of which comprises a loop 47 extending below the bottom of the folder and laterally bent portions 48 forming shoulders for engagement with the flaps, and downwardly bent fingers 49 which enter openings adjacent the edges of the flap portions of the folder. Rods 50 are inserted through the loops 47 which rods engage the lower surface of the bottom of the folder. If desired a single rod may extend through the loops 47 of all of the fasteners.

In this modification the bottom flaps of the folder are bent to form reinforcing ribs 51 the contacting portions of which ribs may be secured together in any suitable manner as by gluing to prevent spreading of the ribs. The eggs are placed in position and the flaps secured in place in this modification substantially as in the modification of Figs. 5, 6, 7 and 8.

It will be noted that in all of the forms the eggs will be firmly gripped and held in position by the engagement of the ends of the eggs with the edges of the holes in the top and bottom of the holders.

Having thus described my invention what I claim as new and desire to secure by Letters Patent is:—

1. An egg holder comprising a sheet bent along four lines to form a bottom portion, two side portions and two upper flap portions, the edges of said flap portions being adjacent each other when folded, each flap being provided with an opening adjacent its edge, and means for holding said flap portions in folded position comprising a portion secured to said bottom portion, a portion extending from said bottom portion to said upper portions, and portions extending between said edges and portions engaging said openings.

2. An egg holder comprising two spaced parallel sheet portions each having a plurality of egg receiving apertures therethrough, the apertures in one portion being arranged opposite the apertures in the other portion, the edges of said apertures lying substantially in the planes of the respective sheets, one of said sheet portions being provided with reinforcing ribs extending between said apertures and continuous substantially across the sheet, and means for securing said sheet portions in proper relative position to cause the edges of said apertures to grip and hold the eggs firmly in position.

3. An egg holder comprising two spaced parallel sheet portions each having a plurality of egg receiving apertures therethrough, the apertures in one portion being arranged opposite the apertures in the other portion, the edges of said apertures lying substantially in the planes of the respective sheets, one of said sheet portions being provided with reinforcing ribs extending between said apertures, and continuing substantially across said sheet, said ribs comprising parallel contiguous sheet portions secured together and continuous substantially across the sheet, and means for securing said sheet portions in proper relative position to cause the edges of said apertures to grip and hold the eggs firmly in position.

4. An egg holder comprising two parallel sheet portions each having a plurality of egg receiving openings therein, the openings in one portion being arranged opposite the openings in the other portion, means for securing said sheet portions in proper relative position comprising fastening means of sheet material bent to provide two substantially parallel members extending between said sheet portions, the ends of said parallel members being bent laterally to provide shoulder portions for engaging one of said sheet portions.

In witness whereof, I have hereunto subscribed my name.

ALFRED COPONY.

Copies of this patent may be obtained for five cents each, by addressing the "Commissioner of Patents, Washington, D. C."